United States Patent [19]

Steiner

[11] 4,336,610
[45] Jun. 22, 1982

[54] METHOD AND AN ARRANGEMENT FOR ADDRESS-FREE FAULT LOCATION BY LOOP CLOSURE IN MESSAGE TRANSMISSION LINKS

[75] Inventor: Erhard Steiner, Eichenau, Fed. Rep. of Germany

[73] Assignee: Siemens Aktiengesellschaft, Berlin & Munich, Fed. Rep. of Germany

[21] Appl. No.: 104,271

[22] Filed: Dec. 17, 1979

[30] Foreign Application Priority Data

Feb. 2, 1979 [DE] Fed. Rep. of Germany ....... 2904057

[51] Int. Cl.³ .......................... H04J 3/14; H04B 3/46
[52] U.S. Cl. ............... 370/15; 179/175.31 R
[58] Field of Search .................... 370/15, 97; 179/175.31 R, 175.3 R

[56] References Cited

U.S. PATENT DOCUMENTS 3,054,865 9/1962 Holloway et al. ......... 179/175.31 R
3,458,661 7/1969 Forde et al. .......................... 370/15
3,739,098 6/1973 Camiciottoli et al. ................ 370/15
3,842,220 10/1974 Arras ........................... 179/175.31 R

FOREIGN PATENT DOCUMENTS 1551172 8/1979 United Kingdom .

Primary Examiner—Douglas W. Olms
Attorney, Agent, or Firm—Hill, Van Santen, Steadman, Chiara & Simpson

[57] ABSTRACT

A method and an arrangement for the address-free fault locating by means of loop closure for a message transmission link which contains regenerating and/or amplifying intermediate stations in specific spacings provides that transmission links of this sort are monitored such that, from a locating end station, in a distant intermediate station, a connection is completed from the one to the other transmission direction and via this connection, test signals are transmitted. For the saving of the switches which separate the further link parts, the transmission of the loop closure signal is interrupted for a specific characteristic duration. The method according to the invention and the corresponding arrangement are in particular suited for insertion in light wave-guide transmission systems.

12 Claims, 2 Drawing Figures

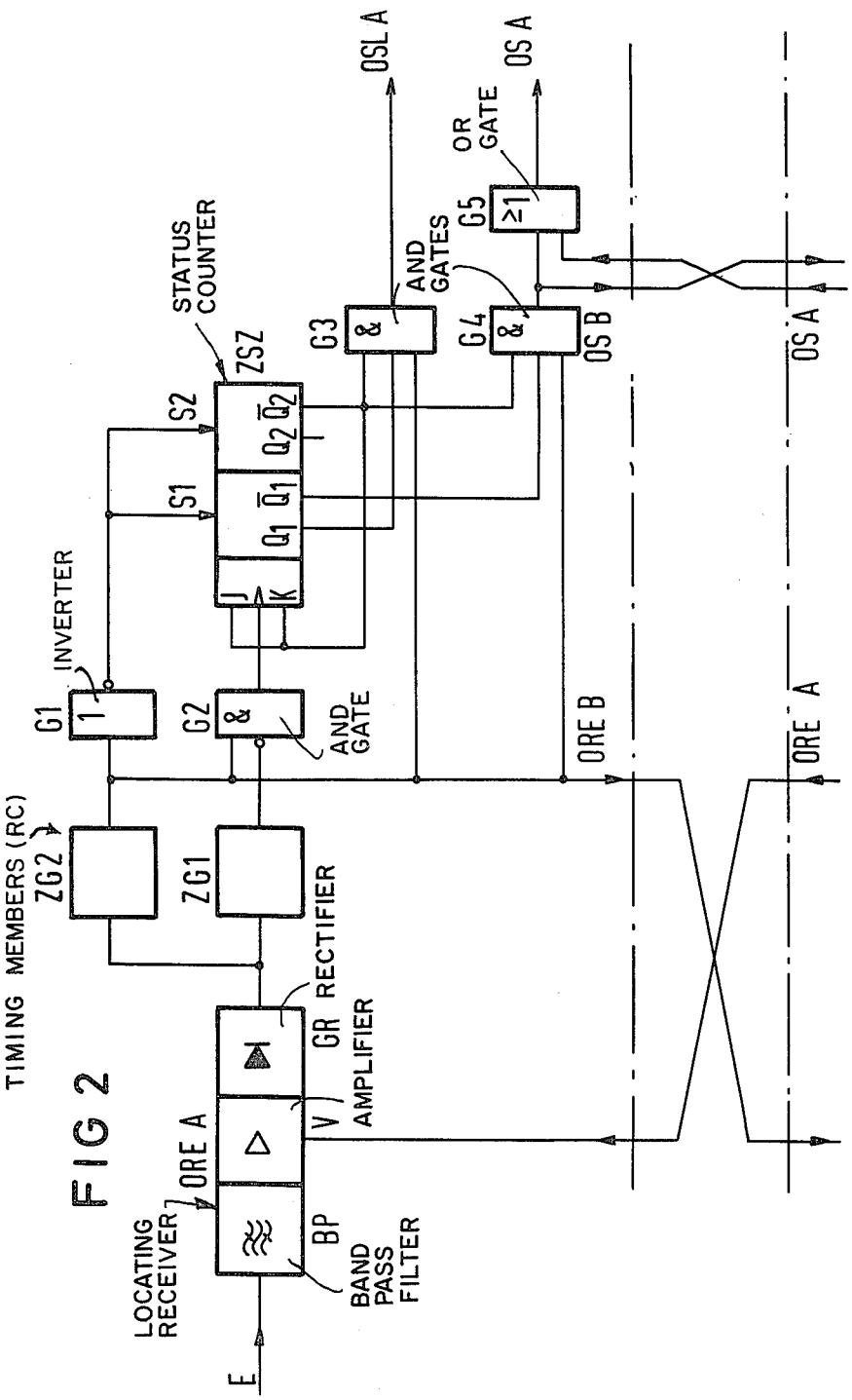

METHOD AND AN ARRANGEMENT FOR ADDRESS-FREE FAULT LOCATION BY LOOP CLOSURE IN MESSAGE TRANSMISSION LINKS

BACKGROUND OF THE INVENTION

1. Field of the Invention

The present invention relates to a method and to a device for an address-free fault location by means of loop closure for a message transmission link from a locating end station via at least one intermediate station which regenerates and/or amplifies the transmission signals in both transmission directions which intermediate station contains a loop closure switch for the connection of the output of the intermediate station for the one transmission direction with its input for the other transmission direction.

2. Description of the Prior Art

Cable links for the transmission of carrier-frequency or digital signals contain intermediate stations which are inserted at specific spacings into the transmission link, in which intermediate stations the transmitted signal is regenerated and/or amplified. Even the light wave-guide transmission systems which have recently arisen require regenerating and amplifying intermediate stations at specific spacings because of the attenuation and distortion characteristics of the light guides which are used. These intermediate stations thereby correspond to the intermediate stations for copper cable, only an optical signal receiver is preconnected and an optical transmitter is postconnected. The intermediate stations are thus, as a rule, inserted such that amplifiers and regenerators for the one conversation direction are housed with those for the other conversation direction together in a common housing. The other end station is thereby equipped just like the intermediate station and it can also be located. This common housing makes possible the loop closure, wherein, in the intermediate station, a connection is made from the regenerator and amplifier device for the one transmission direction with the regenerator and amplifier device for the other transmission direction and, via this connection, a test signal which is sent out from the locating end station is returned. The loop closure can thereby be released by means of the transmission of a specific address in an intermediate station which recognizes this address. There are also known, for example from the German Patent Application No. P 2,653,201.4, address-free fault locating methods in the case of which, by means of the transmission of specific preparation and loop closure signals, a loop closure is produced, and by means of short duration interruption of the transmission of the loop closure commands, the connecting further of the loop closure is brought about to the next intermediate station. The loop closure is thereby not controllable simultaneously from both end stations; however, in general, this is also not practical.

In the case of loop closures of this sort, with respect to the unambiguous assignment of recognized faults, it is important that, if possible, all components which are important for the signal transmission in the intermediate station are connected into the loop closure path and tested. This applies in particular for those optical transmitters and receivers in light wave-guide transmission systems which are susceptible to alteration and interference. With respect to the complete testing of all components, the loop closures should therefore proceed from the transmitting end stage of the one transmission direction to the receiving input of the other transmission direction. In the case of copper cables, there hereby results the difficulty that between the transmitter end stage and the transmission cable, a separating switch must be provided which, on the one hand, must be suited for the switching of comparatively high powers and, on the other hand, must be capable of switching signals of comparatively high frequency. In the case of light wave-guide transmission systems, such optically functioning operating switches which have high reliability are not known at this time, so that the solution does not readily exist for light wave-guide transmission systems.

SUMMARY OF THE INVENTION

The problem and, therefore, the object of the invention is to provide a method of the kind generally described above in the case of which the connection between a transmitting end stage and a transmission link need not be separated.

According to the invention, the problem is solved and the object achieved in that, during the total fault locating process from the locating end station, a single fault locating signal is released which contains periodically alternating sections of preselected duration with a test signal and those with a loop closure signal which remains the same over the total locating process. As a loop closure signal, a signal which occurs in the normal operation with sufficiently low probability is provided. A first holding time is provided so that interferences, the duration of which do not exceed this first holding time, do not influence the recognition of the loop closure signal in the intermediate station. The duration of the test time section is selected to be smaller than the first holding time, and after undisturbed receiving of the loop closure signal over a predetermined recognition time in the intermediate station, a transfer occurs into a preparation position and in addition, at least almost simultaneously, the signal transmission from the intermediate station is interrupted in both transmission directions. Transfer occurs from the first holding time to a comparatively longer second holding time and the receiving and control device for the loop closure signal is brought into a preparation position. Following this, in the locating end station, after a time which exceeds the second holding time and can be lengthened randomly, the release of the loop closure signal is interrupted for a switching pulse duration which is longer than the first holding time and shorter than the second holding time and than the recognition time. In the prepared intermediate station, the loop closure is connected and the signal transmission is again switched-in, in both transmission directions, and thereby, the postconnected intermediate stations first again receive the fault locating signal which contains the loop closure command. The directly following intermediate station is brought into the preparation position after the recognition time, and thereafter, in the locating end station, after a time which exceeds the sum of recognition time and second holding time and which can be randomly lengthened for the locating measurements, the releasing of the loop closure signal is again interrupted for switching pulse duration. Thereby the loop closure which is connected in the intermediate station is suppressed and the loop closure receiver for the further locating time is blocked. In addition, the directly following intermediate station is brought into the loop closure position, and for the further switching of the loop closure, the release of the loop closure signal in the locating end station is again interrupted.

The method according to the invention offers the significant advantage of universal employability, so that, for example, parallel arranged carrier frequency transmission systems, digital systems and light waveguide transmission systems can be monitored together by means of the same method and thereby also, link substitute circuits are made easier.

BRIEF DESCRIPTION OF THE DRAWINGS

Other objects, features and advantages of the invention, its organization, construction and operation will be best understood from the following description, taken in conjunction with the accompanying drawings, on which:

FIG. 2 shows a schematic circuit diagram of a fault locating receiver according to the invention.

DESCRIPTION OF THE PREFERRED EMBODIMENTS

Figure 1:
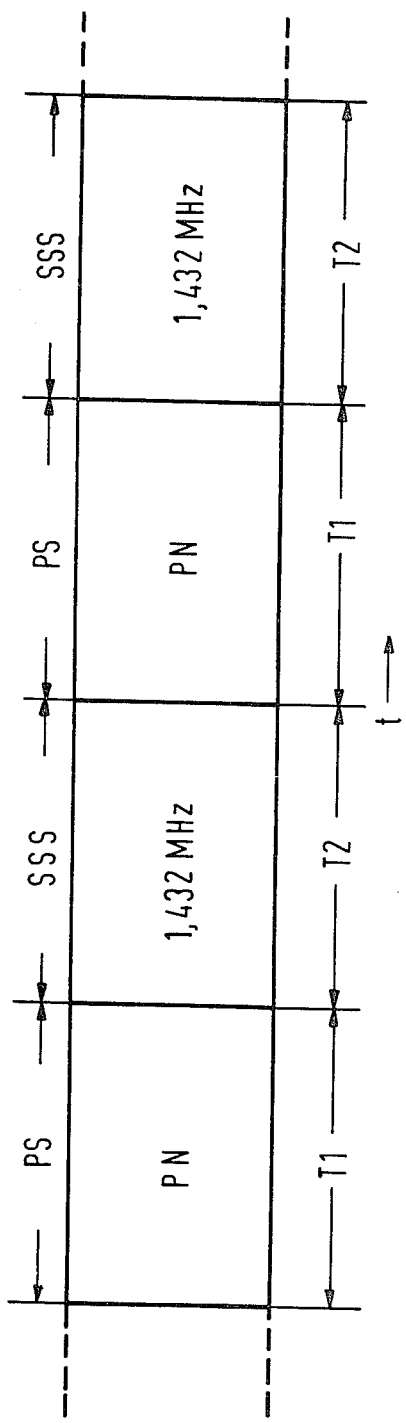
FIG. 1 shows the representation of the fault locating signal with the test signal and the loop closure signal sections.

In FIG. 1, a section is represented from the fault locating signal which is sent out by the locating end station and is used in the exemplary embodiment. The fault locating signal comprises consecutive test signal sections PS and loop closure signal sections SSS, whereby, the duration of these sections T1, T2 in each case amount to 3.8 ms. The test signal sections are in each case parts of a pseudorandom sequence PN, while the loop closure signal sections SSS are parts of a periodic square wave with the frequency 1.432 MHz. For making the synchronization in the locating device easier, thereby the signal alternations between test signal and loop closure signal are rigidly phase synchronous. This synchronization in the receiving part of the locating device is important with respect to the bit fault rate measurements and the transit time measurements, which proceed at the fault locating signals which are looped through.

A fault locating signal of this sort is used in the exemplary embodiment for the address-free fault location by means of loop closure in a messege transmission system for digital signals. The transmission of the digital signals proceeds via light wave-guides; therefore, additionally a conversion of the electrical signals into optical signals by means of a laser diode as an optical transmitter and a conversion back with a photodiode is necessary. From the photodiode, the received signal is fed to an amplifier which has the input of the actual intermediate regenerator for this transmission direction connected thereto. Additionally, the intermediate regenerator contains a locating receiver, which serves for receiving the fault locating signal and for the recognition of the loop closure signal.

In FIG. 2, the principal circuit of a locating receiver of this sort is represented, which is connected with its input E to the output of the photodiode amplifier. The locating receiver ORE A for the transmission direction A contains a band pass filter which is matched to the frequency of 1.432 MHz, a post-connected amplifier V which can be disconnected by means of a control signal from the opposing direction and, a rectifier GR which is connected to the amplifier output. Therefore, this part of the locating receiver operates as resonance amplifier which, upon receipt of the loop closure signal with the mentioned frequency, releases at its output a positive logic level which represents logical "1". The inputs of a first and of a second time member (ZG1), (ZG2) are connected to the output of the output of the locating receiver ORE A and are constructed as RC members. With the output of the second time member ZG2 are connected the input of a first gate G1 which is connected as an inverter to the one input of a second gate G2 which is connected as an AND gate, the first input of a third gate and a fourth gate G3, G4 which are connected in each case as AND gates and the switching input of the locating receiver ORE B for the opposing direction. By means of this connection to the locating receiver for the opposing direction, this is disconnected as soon as the locating receiver for the A direction has responded. It is thereby prevented that a double loop closure is connected. Therefore, the same fault locating signals and, therefore, also the same locating receiver and the same locating devices in the end station can be used for both transmission directions A, B.

With the output of the inverter G1 are connected the set inputs S1, S2 of two stages of a status counter ZSZ which is constructed by means of JK flip-flops. The output of the first time member ZG1 is connected with an inverting input of the AND gate G2, the output of which is connected with the clock pulse input of the status counter. The output Q1 of the first stage of the status counter is connected with the second input of the third gate G3, whereas the inverse output $\overline{Q1}$ is connected with the second input of the fourth gate G4. In addition, the inverse output $\overline{Q2}$ of the status counter is connected with the J input and the K input of the status counter and with the third inputs of the third gate G3 and of the fourth gate G4. From the output of the third gate G3, a control signal OSL A is emitted, upon the occurrence of which the loop closure proceeds. From the output of the fourth gate, a control signal OS B is emitted at the input of a fifth gate G5, which is connected as an OR gate and at a control device, by means of which the optical transmitter for the opposing direction is disconnected.

A corresponding signal OS A is received by the gate G4 of the locating receiver ORE B for the opposing direction and is supplied to the second input of the fifth gate G5, which at its output emits a control signal OS A, by means of which the optical transmitter for this transmission direction is switched off.

For an explanation of the manner of operation of the locating receiver according to FIG. 2, let it first be assumed that the normal operating state is present. In the normal operating state, no fault locating signal is sent, the second time member ZG2 is thus discharged and the status counter ZSZ is placed in position "0". At the beginning of the fault locating, the fault locating signal is transmitted. The recognition of the loop closure signal, which is contained in the fault locating signal, and the release of the status counter for the receiving of switching pulses proceeds only after the fault locating signal (with the loop closure signal) is present uninterruptedly for the recognition time T5 of approximately 400 ms. Uninterrupted means that whatever interruptions occur do not last longer than a first holding time T3 of 10 ms. The ratio between the recognition time T5 and the first holding time T3 should be selected to be as large as possible in order to keep the probability of a chance simulation of the loop closure signal small. Nevertheless, it should be noted that the first holding time T3 is to be selected to be longer than the duration T1 of 3.8 ms of the test signal, so that the mixing in of the test signal is not interpreted as interruption of the loop closure signal.

After an undisturbed receiving of the loop closure signal beyond the recognition time T5, the locating station, all other intermediate stations again fall away. The directly following intermediate station further receives the loop closure signal via the optical transmitter of the first intermediate station and it remains in the preparation position. For the explanation of this mechanism, reference is taken to Table I.

TABLE I

| OPERATING STATES OF THE INTERMEDIATE REGENERATORS | | | | | | | | |
|---|---|---|---|---|---|---|---|---|
| Operating State Locating Receiver A | Locating Signal in Direction A "Recognized" | Status Counter in Position | Locating A | Receiver B | Optical A | Transmitter B | Loop A | Closure B |
| — | no | "0" | in | in | in | in | out | out |
| V | yes | "0" | in | out | out | out | out | out |
| S | yes | "1" | in | out | in | in | in | out |
| BS | yes | "2" | in | out | in | in | out | out |

— Normal State
V. - Prepared for Loop Closure
S - Loop Closure
BS - Blocked for Loop Closure
Bei - In case of Fault Locating in Direction B, A and B are to be Exchanged in the Table receiver finds itself in a preparation position for the loop closure. Thereby, in the second time member, internally the time constant is switched over and instead of the first holding time T3, now the comparatively longer second holding time T6 of approximately 400 ms becomes active. In addition, by means of the signal which is emitted by the second time member ZG2, the signal transmission from the intermediate station is interrupted in both transmission directions by disconnecting of the optical transmitter and the second gate G2 is released, so that switching pulses which occur can proceed to the input of the status counter ZSZ. Because of the time constant of the first time member ZG1, thereby, only those interruptions of the locating signal are evaluated as switching pulses which are longer than a minimum duration T4 of 40 ms and shorter than a maximum duration of 400 ms. During the interruption of the loop closure signal, for the securing of the clock pulse synchronization, the test signal is transmitted.

During the recognition time, the optical transmitters are in operation, so that first the locating receivers of the further intermediate stations also respond, disconnect their end stages, switch over the second time member and activate the second gate. However, after the second holding time T6 of 400 ms has been exceeded, the locating receivers in these intermediate stations return again to their initial state, since because of the end stage which was switched off in the first intermediate station, the loop closure signal (does not appear). Only after this can the sending out of the loop closure signal be interrupted for a switching pulse duration T4 of approximately 50 ms from the locating end station. This interruption is recognized by the time member ZG1 and a corresponding output signal is emitted via the gate G2 to the input of the status counter ZSZ, which thereby is switched into the counter position "1", the loop closure position. Thereby, the optical end stages are connected in again in the intermediate station for both transmission directions and transmit the fault locating signal on the one side to the next intermediate station and on the other side via the loop closure back to the receiver of the locating device. With this, the fault measurement can begin via this intermediate station. In addition, the following regenerators switch into the preparation position after the recognition time of T5=400 ms. For this purpose, in each case the optical transmitter is disconnected in the intermediate stations so that except for the directly following intermediate The loop closure position in the first intermediate station and the preparation position in the second intermediate station are maintained until the measuring time is ended by a second interruption for the switching pulse duration. In order to prevent disturbances in each case in the initial phase of the measurements, in the case of the embodiment example, after the loop closure, the measurement is still interrupted for approximately 0.7 s. With the recognition of the second switching pulse by means of the first switching member ZG1, the switching member ZG1 emits a further switching pulse to the first status counter ZSZ via the second gate G2. By means of this switching pulse, the status counter ZSZ is brought into the counter position "2" and is blocked in this position. Thereby, the loop closure in this intermediate station is canceled and the status counter, and therefore the locating receiver, is blocked in this intermediate station for further loop closure signals. Besides this, however, in the second intermediate station, which found itself in the preparation position, the loop closure is recognized and connected and, in addition, the optical end stages for both transmission directions are again connected in. With this, the measuring time begins for the second intermediate station at the recognition time for the further intermediate stations. After the recognition time, the third intermediate station remains in the preparation position, while all further intermediate stations again drop away.

A further interruption of the loop closure signal in the locating end station for the switching pulse duration of approximately 50 ms brings about the switching further of the loop closure from the second to the third intermediate station, in a corresponding manner, each further interruption of that sort functions as switching signals for the switching further of the loop closure to the next intermediate station. The switching further of the loop closure along the link is represented in a form suited for overview in Table II. By means of the nth clock pulse, therefore, the n−1 intermediate station is blocked (BS), the loop closure is switched into the nth intermediate station (S) and the n+1 intermediate station is brought into the preparation position V.

TABLE II

| Loop Closure | Intermediate Station | | | | | | | | |
|---|---|---|---|---|---|---|---|---|---|
| Signal | 1 | 2 | 3 | 4 | — | N−1 | N | N+1 | N+2 |
| out | — | — | — | — | | — | — | — | — |

TABLE II-continued

| Loop Closure Signal | Intermediate Station | | | | | | | | |
|---|---|---|---|---|---|---|---|---|---|
| | 1 | 2 | 3 | 4 | ... | N-1 | N | N+1 | N+2 |
| in | V | — | — | — | | — | — | — | — |
| 1. Clock Pulse | S | V | — | — | | | | | |
| 2. Clock Pulse | BS | S | V | — | | | | | |
| 3. Clock Pulse | BS | BS | S | V | | | | | |
| (N−1). Clock Pulse | BS | BS | BS | BS | | S | V | — | — |
| N. Clock Pulse | BS | BS | BS | BS | | BS | S | V | — |
| (N+1). Clock Pulse | BS | BS | BS | BS | | BS | BS | S | V |
| (N+2). Clock Pulse | BS | BS | BS | BS | | BS | BS | BS | S |

Although I have disclosed my invention by reference to specific illustrations, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for address-free fault locating, by loop closure, for a message transmission link, from a locating end station via at least one intermediate station which regenerates and/or amplifies the transmission signals of both transmission directions and which includes a loop closure switch for connecting the output of the intermediate station for one transmission direction with its input for the other transmission direction, and in which, for relaying the loop closure to the next intermediate regenerator, the loop closure signal is briefly interrupted, comprising the steps of:
transmitting from the fault locating end station, during the total fault locating process, a fault locating signal in place of the normal loop closure signal which comprises alternating first and second test time sections of respective first and second predetermined durations including a test signal and a loop closure signal which remains the same over the total locating process, the first duration of the test signal selected to be shorter than a first predetermined holding time, and the first predetermined holding time selected such that interference of durations which do not exceed the predetermined holding time do not impair the recognition of the loop closure signal in the intermediate station;
receiving the loop closure signal in the intermediate station and after such receipt for a predetermined recognition time switching the intermediate station into a preparation condition, interrupting signal transmission in the transmission direction of the intermediate station, transferring from the first predetermined holding time to a longer second predetermined holding time, and switching a receiving and control device for the loop closure signal into the preparation condition; then, after an interval which does not exceed the second predetermined holding time, interrupting the transmission of the loop closure signal from the fault locating end station for a switching pulse duration which is longer than the first predetermined holding time and shorter than the second predetermined holding time and the predetermined recognition time to cause loop closure in the prepared intermediate station and reconnect signal transmission therethrough in both transmission directions so that post-connected intermediate stations first again receive the fault locating signal including the loop closure signal and a directly-following intermediate station is brought into the prepared condition after the predetermined recognition time;
then, in the fault locating end station, and after a time which may be selected for locating measurements and which may exceed the sum of the predetermined recognition time and the second predetermined holding time, interrupting the loop closure signal for the switching pulse duration to cancel the loop closure in the first intermediate station, block the receiving device thereof for a further locating time and cause loop closure in the following intermediate station; and for further switching of loop closure through the transmission link, interrupting the loop closure signal at the fault locating end station.

2. The method of claim 1, comprising the further step of:
transmitting a test signal during the interruption duration.

3. The method of claim 1, comprising the further step of:
setting the recognition time and the second predetermined holding time to be equal.

4. The method of claim 1, comprising the further steps of:
setting the first and second predetermined durations of the first and second test time selections each to be 3.8 ms; setting the first predetermined holding time to be 10 ms; setting the switching pulse duration to be 50 ms; and
setting the recognition time and the second predetermined holding time each to be 400 ms.

5. The method of claim 1, for digital message transmission links, comprising the steps of:
generating a pseudo-random sequence as the test signal.

6. The method of claim 1, comprising the step of:
generating a rectangular wave of a predetermined frequency as the loop closure signal.

7. The method of claim 1, comprising the step of:
generating a code word as the loop closure signal.

8. The method of claim 1, comprising the step of:
modulating the test signal to produce the loop closure signal.

9. The method of claim 1, comprising the step of:
generating the loop closure signal and the test signal in phase synchronism.

10. The method of claim 1, comprising the step of:
generating the loop closure signal as a part of a pseudo-random sequence having a characteristic repetition frequency.

11. In an intermediate station of a message transmission link for transmission in both locating transmission directions, a respective receiver, including an amplifier, for each transmission direction for receiving a loop closure signal and responsive thereto to switch on a predetermined logic state, a first memory connected to the output of said amplifier for storing the loop closure signal for first and second predetermined holding times and during a predetermined interruption interval of the loop closure signal as a switching pulse interval, and a second memory connected to the output of said first memory including a counter for storing the count thereof in each case corresponding to the appearance of switching pulses which are equal to or greater than the switching pulse interval.

12. The intermediate station of claim 11, wherein said first memory comprises an RC circuit.

* * * * *